United States Patent
Hasegawa

(10) Patent No.: US 8,722,277 B2
(45) Date of Patent: May 13, 2014

(54) FUEL CELL AND METHOD FOR MANUFACTURING SAME

(75) Inventor: Takuya Hasegawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 108 days.

(21) Appl. No.: 13/384,615

(22) PCT Filed: Aug. 4, 2010

(86) PCT No.: PCT/JP2010/063205
§ 371 (c)(1),
(2), (4) Date: Jan. 18, 2012

(87) PCT Pub. No.: WO2011/016493
PCT Pub. Date: Feb. 10, 2011

(65) Prior Publication Data
US 2012/0122012 A1     May 17, 2012

(30) Foreign Application Priority Data
Aug. 7, 2009 (JP) .................. 2009-184358

(51) Int. Cl.
*H01M 8/02* (2006.01)
*H01M 8/10* (2006.01)

(52) U.S. Cl.
USPC ................... 429/483; 429/508; 429/509

(58) Field of Classification Search
USPC ..................... 429/483, 508–509
See application file for complete search history.

(56) References Cited

U.S. PATENT DOCUMENTS

| | | | |
|---|---|---|---|
| 5,807,507 A | 9/1998 | Hirano et al. | |
| 6,387,557 B1 * | 5/2002 | Krasij et al. | 429/465 |
| 6,730,426 B2 * | 5/2004 | Wangerow | 429/434 |
| 6,861,171 B1 * | 3/2005 | Suzuki | 429/510 |
| 2002/0068211 A1 | 6/2002 | Inoue et al. | |
| 2004/0101735 A1 | 5/2004 | Wells et al. | |
| 2004/0219417 A1 * | 11/2004 | Finkenwirth et al. | 429/35 |
| 2005/0098962 A1 * | 5/2005 | Duclos et al. | 277/628 |
| 2005/0186463 A1 * | 8/2005 | Finkenwirth et al. | 429/35 |
| 2006/0134509 A1 * | 6/2006 | Ping et al. | 429/44 |
| 2007/0212587 A1 * | 9/2007 | Fragiadakis et al. | 429/35 |

FOREIGN PATENT DOCUMENTS

| | | |
|---|---|---|
| JP | 2135611 A | 5/1990 |
| JP | 06-172725 A | 6/1994 |
| JP | 07-207161 | 8/1995 |
| JP | 10120904 A | 5/1998 |
| JP | 2007141486 A * | 6/2007 |
| JP | 2009-037975 | 2/2009 |
| WO | 2008-156218 A2 | 12/2008 |

OTHER PUBLICATIONS

Communication and the Extended European Search Report dated Dec. 10, 2013, from the corresponding European Patent Application No. 10806492.4.

* cited by examiner

*Primary Examiner* — Gregg Cantelmo
(74) *Attorney, Agent, or Firm* — Young Basile

(57) ABSTRACT

A fuel cell and its production method are provided to enable position adjustment at the time of provisional lamination of unit cells. In a fuel cell comprising a lamination of a membrane electrode assembly including anode and cathode electrode layers on both sides of an electrolyte membrane, and a separator, the fuel cell and its production method is characterized in that there is further provided a self-fusing seal material at an end portion of the membrane electrode assembly or the separator.

13 Claims, 7 Drawing Sheets

FUEL CELL AND METHOD FOR MANUFACTURING SAME

CROSS REFERENCE TO RELATED APPLICATION

This application claims priority to Japanese Patent Application No. 2009-184358 filed on Aug. 7, 2009 and incorporated herein by reference in its entirety.

TECHNICAL FIELD

The present invention relates to a fuel cell and a method for manufacturing fuel cells.

BACKGROUND

A fuel cell is a kind of power generating device generating electric power by oxidizing fuel such as hydrogen and methanol electrochemically. In recent years, attention is paid to the fuel cell as a source for supplying clean energy. Fuel cells are classified by the type of electrolyte, into phosphoric acid type, molten carbonate type, solid oxide type and solid polymer electrolyte type. Among them, the solid polymer electrolyte fuel cell (also referred to simply as "PEFC") is a fuel cell arranged to generate power by supplying hydrogen to one side and oxygen to the other side of a membrane electrode assembly (also referred to as "MEA") including electrodes on both sides of an electrolyte membrane. Since PEFC can provide an output density comparable to an internal combustion engine, research is widely performed for practical use as a power source for an electric vehicle and other applications.

In general, PEFC is in the form of fuel cell stack including a plurality of unit cells each including integrally a solid polymer electrolyte membrane, and hydrogen side and oxygen side electrodes confronting each other across the solid polymer electrolyte membrane. These unit cells are stacked through separator(s). Between each separator and an adjacent electrode, there is provided a gas diffusion layer of porous material normally having an electric conductivity. The gas diffusion layer is arranged to undertake a role to enable stable exchange of hydrogen, oxygen, water, electrons, heat etc., among the electrode layer and an external circuit.

As a fuel cell for vehicles, wide use is made of a stack type fuel cell including a stack of unit cells each of which includes a sheet-shaped MEA and a sheet-shaped separator. Normally, the thickness of a unit cell is smaller than or equal to 10 mm. Within this thickness, the unit cell is required to allow simultaneous flows of various fluids including a fuel gas and an oxidizing gas, and further including other fluid (such as a cooling water) in some cases. Therefore, the unit cell requires a complicated seal structure provided for each fluid passage, and this requirement contributes to deterioration of the productivity of fuel cells.

As such seal technique, there are known a technique using a repulsion force of an elastic member, a technique using adhesion or sticking, a technique using fixing or pressing with compressive material, and a technique using mechanical deformation such as staking or caulking. Among these, the technique using the repulsion force of the elastic material is widely used because of advantages, 1) high reliability, 2) high durability, and 3) possibility of exfoliation or peeling. However, this technique is limited in the reduction of the thickness and the size of the fuel cell because of the necessity of a predetermined margin for contraction or squash.

The technique using, as sealing material, the adhesive (liquid material after coating; and adhesiveness is achieved by hardening or curing) is advantageous for the reduction of thickness and size since the margin for contraction or squash is not needed. However, there is a need for preventing contact of material other than the material to be bonded, to the surface coated with the adhesive before hardening. Moreover, at the time of layer stack of unit cells coated with the adhesive, the adhesive is flowable until hardening. Therefore, though minute position adjustment is possible, the lamination is liable to shift to a deviated position by external cause or other influence.

The technique using, as sealing material, the sticky agent (gel-like solid material after coating; and adhesiveness is achieved by pressure; also called pressure sensitive adhesive) is advantageous for the reduction of thickness and size since the margin for contraction or squash is not needed. United States patent application publication 2002/068211A discloses a technique using the sticky agent.

BRIEF SUMMARY

However, in the technique disclosed in United States patent application publication 2002/068211A, the sticking agent does not have a flowability unlike the adhesive. Therefore, the position adjustment is unfeasible at the time of layer stack of unit cells, and there is a need for a precision position control apparatus not requiring the position adjustment after the layer stacking.

The present invention is devised to solve the above-mentioned problems. It is an object of the present invention to provide fuel cell and production method enabling position adjustment at the time of stacking unit cells.

After keen research for solving the above-mentioned problems, the present invention has been completed by the inventor with finding that the position adjustment becomes feasible at the time of stacking unit cells by the use of a self-fusing seal material having a specified tack property.

The fuel cell according to the present invention is provided with a self-fusing seal material having a certain tack property. This self-fusing seal material does not develop a tack property under a pressure at a level of a pressure generated by provisional lamination of unit cells of the fuel cell. Therefore, the position adjustment is feasible after the provisional lamination. After the position adjustment, it is possible to produce a strong adhesive force by pressurization, so that the productivity of the fuel cell can be improved

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
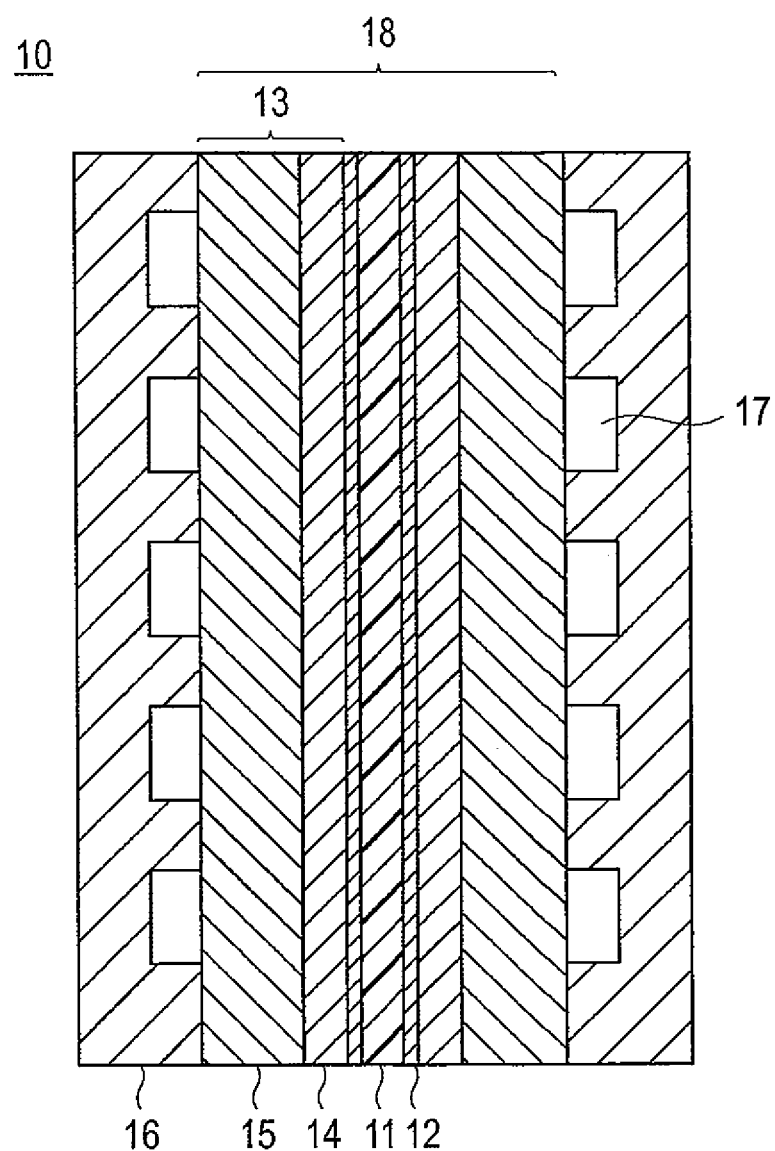
FIG. 1 is a sectional view schematically showing the construction of a solid polymer fuel cell.

The present invention is explained hereinafter with reference to the drawings. In explanation of the drawings, the same element is given the same reference numeral and repetitive explanation is omitted. In the drawings, the proportions of dimensions may be exaggerated for the convenience of explanation, and may be unequal to the actual proportions in some cases.

FIG. 1 schematically shows the structure of a solid polymer type fuel cell (PEFC) 10 of a preferred embodiment. In fuel cell 10, a membrane electrode assembly 18 includes a pair of catalyst layers 12 (anode catalyst layer and cathode catalyst layer) disposed on both sides of a solid polymer electrolyte membrane 11 in confrontation to each other. This laminate structure is sandwiched between a pair of gas diffusion layers 13 (anode side gas diffusion layer and cathode side gas diffusion layer). The member electrode assembly 18 is referred to as MEA, and the assembly of solid polymer electrolyte membrane 11 and catalyst layers 12 is referred to as CCM, in some cases. In FIG. 1, each of gas diffusion layers 13 includes a base material or substrate 15 and a microporous layer (MPL) 14, which is put in contact with the (adjacent) catalyst layer 12. However, the microporous layer (MPL) 14 is not indispensable, and the gas diffusion layers 13 may be made up only of the base material 15. A pair of separators 16 (anode side separator and cathode side separator) are disposed on the outer sides of base materials 15. Each separator 16 has a groove structure for forming gas passage(s) 17 (fuel gas on the anode side, and an oxidizing agent gas on the cathode side), and water passage(s) 17'. The solid polymer type fuel cell is constructed in this way.

Figure 2:
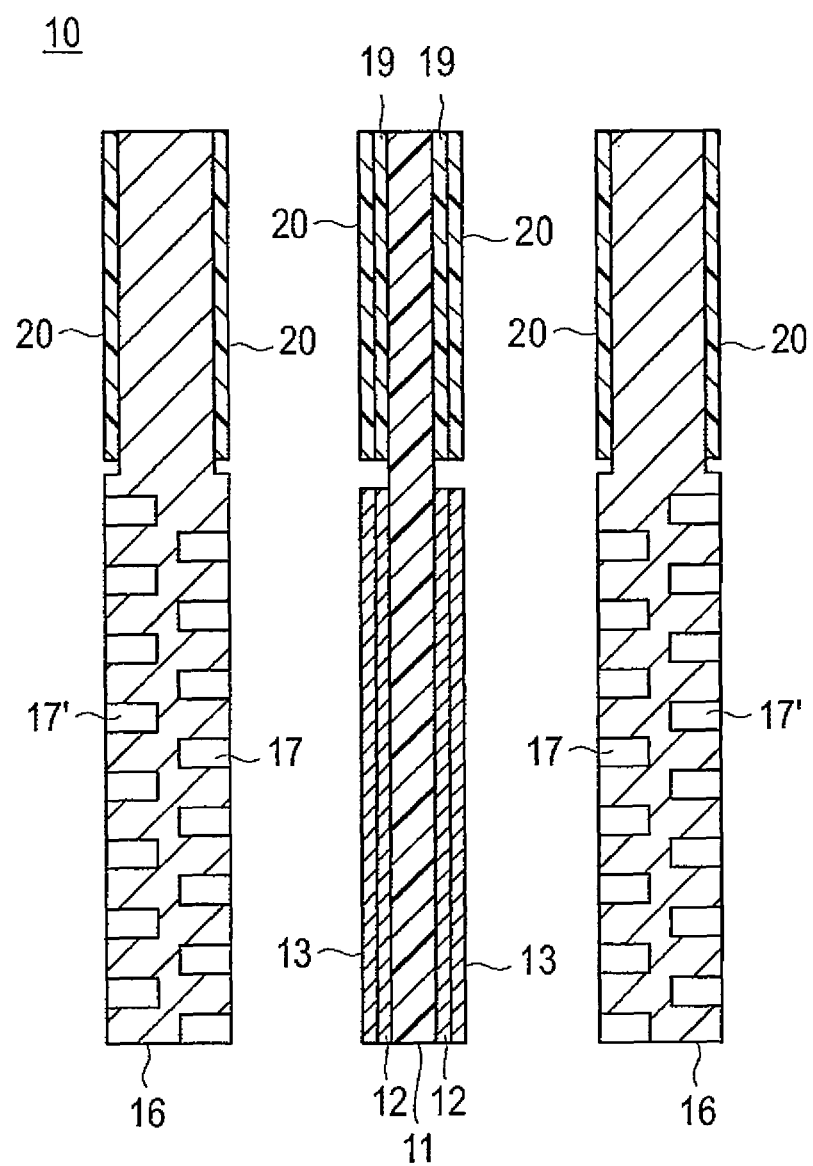
FIG. 2 is an enlarged sectional view schematically showing parts of the solid polymer fuel cell shown in FIG. 1, on an enlarged scale.

FIG. 2 is a sectional view schematically showing parts of the solid polymer fuel cell 10 of FIG. 1 on an enlarged scale. As shown in FIG. 2, an end portion of the electrolyte membrane 11 of solid polymer fuel cell 10 is provided with self-fusing seal material 20.

As the sealing technique provided for the unit cell of the fuel cell, there are the technique using the adhesive and the technique using the sticking agent, as mentioned before. The adhesive and sticking agent do not require a margin for contraction or squash, so that these techniques are advantageous for reduction of thickness and reduction of size. However, in the technique using the adhesive, it is necessary to protect the surface coated with the adhesive so as to prevent contact with material other than the material to be bonded, before hardening of the adhesive. Moreover, at the time of stacking the layers of unit cells coated with the adhesive, the adhesive is flowable until hardening. Therefore, though minute position adjustment is possible, the unit cells in the stack are liable to shift to a deviated position by external cause or other influence. In the technique using the sticking agent (gel-like solid material after coating; and adhesiveness is achieved by pressure; also called "pressure sensitive adhesive"), the sticking agent does not have flowability as the adhesive does. Therefore, the position adjustment is unfeasible at the time of stacking the layers of the unit cells, and there is a need for a precision position control apparatus not requiring the position adjustment after the layers are stacked.

By contrast, the fuel cell according to the present invention includes self-fusing seal material having a predetermined tack characteristic. This self-fusing seal material is a seal material which can join contact surfaces of seal members of the self-fusing seal material after hardening with each other by fusion at the room temperature or higher temperature raised by heating, by putting or pressing the seal members in contact with each other. Such a self-fusing seal material does not develop the tack characteristic at pressures produced at the time of stack of a considerable number of unit cells for the fuel cell. Therefore, the structure using the self-fusing seal material can allow the position adjustment after provisional lamination of the fuel cell stack. After the position adjustment, the self-fusing seal material can develop a strong adhesive force by pressurization. As a result, this structure can improve the productivity of fuel cells.

FIG. 2 shows the example in which the self-fusing seal material is disposed in the end portion of the electrolyte membrane. However, the position of the self-fusing seal material is not limited to the position shown in FIG. 2. The self-fusing seal material may be disposed in an end portion of the membrane electrode assembly or the before-mentioned separators. Concretely, the self-fusing seal material 20 may be disposed in end portions of the catalyst layers (the anode catalyst layer and the cathode catalyst layer), the gas diffusion layers and the separators. More specifically, the self-fusing seal material may be desirably disposed in an end portion of at least one selected from the group including the electrolyte membrane, the catalyst layers, the gas diffusion layers and the separators. Among these positions, the end portion(s) of the gas diffusion layer or layers is preferable because the porous structure produces a strong anchor effect, and makes it possible to omit a special surface treatment before coating of the self-fusing seal material.

The following is explanation on preferred embodiments of the position of self-fusing seal material 20, with reference to FIGS. 3-7. FIGS. 3-7 are partial enlarged sectional views schematically showing the preferred embodiments of the placement of the self-fusing seal material in the fuel cell according to the present invention.

Figure 3:
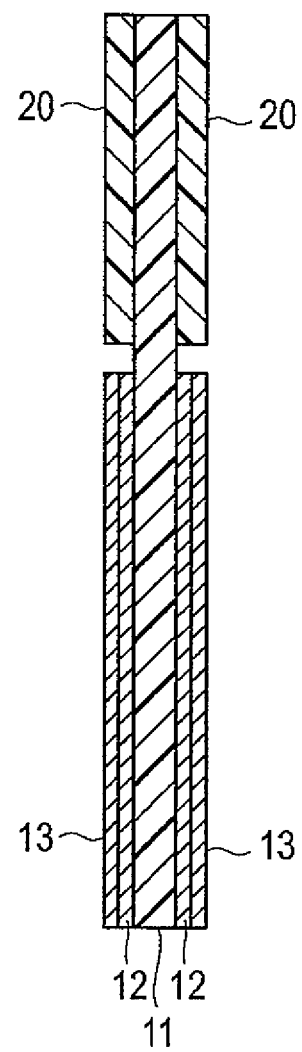
FIG. 3 is an enlarged partial sectional view schematically showing a first preferred embodiment of placement of a self-fusing seal material in a fuel cell according to the present invention.

In FIG. 3, the self-fusing seal material 20 is disposed in an end portion of the solid polymer electrolyte membrane 11. No specific limitation is imposed on the thickness of self-fusing seal material 20. For example, in the case of the membrane electrode assembly including the catalyst layers 12 and gas diffusion layers 13 as shown in FIG. 3, the thickness of a layer of the self-fusing seal material 20 may be set substantially equal to the sum of the thickness of catalyst layer 12 and the thickness of gas diffusion layer 13. Similarly, in the case of the membrane electrode assembly including only the catalyst layers 12 (including no gas diffusion layers 13), the thickness of the layer of the self-fusing seal material 20 may be set substantially equal to the thickness of catalyst layer 12. In this way, it is possible to make substantially uniform the total thickness of the membrane electrode assembly and hence the total thickness of the lamination of each unit cell of the fuel cell.

Figure 4:
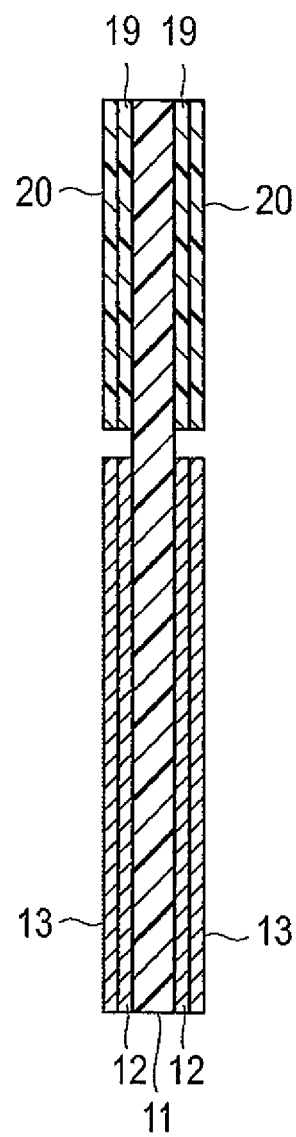
FIG. 4 is an enlarged partial sectional view schematically showing a second preferred embodiment of the placement of the self-fusing seal material in the fuel cell according to the present invention.

In the example of FIG. 3, the end portion of solid polymer electrolyte membrane 11 is provided with the self-fusing seal material 20 alone. However, it is optional to interpose a reinforcement or reinforcing layer 19 between the self-fusing seal material 20 and the solid polymer electrolyte membrane 11 as shown in FIG. 4. Materials known in the technical field can be used as the material of reinforcement layer 19 with no specific limitation. One example of the material of reinforcement layer 19 is polyethylene terephthalate (PET). No specific limitation is imposed on the thickness of reinforcement layer 19. In the case of the membrane electrode assembly including catalyst layers 12 and gas diffusion layers 13, the total thickness of the layer of the self-fusing seal material 20 and the reinforcement layer 19 may be set substantially equal to the sum of the thickness of catalyst layer 12 and the thickness of gas diffusion layer 13. Similarly, in the case of the membrane electrode assembly including only the catalyst layers 12 (including no gas diffusion layers 13), the total thickness of the reinforcement layer 19 and the layer of self-fusing seal material 20 may be set substantially equal to the thickness of catalyst layer 12. In this way, it is possible to make substantially uniform the total thickness of the membrane electrode assembly and hence the total thickness of the lamination of each unit cell of the fuel cell.

In the examples of FIG. 3 and FIG. 4, the self-fusing seal material 20 or the combination of self-fusing seal material 20 and reinforce layer 19 is formed on the end portion of solid polymer electrolyte membrane 11 at a position apart from the end of catalyst layer 12 or gas diffusion layer 13. However, it is optional to form the self-fusing seal material 20 or the combination of self-fusing seal material 20 and reinforce layer 19 on the end portion of solid polymer electrolyte membrane 11 so that the self-fusing seal material 20 or the combination of self-fusing seal material 20 and reinforce layer 19 is in contact with the end of catalyst layer 12 or gas diffusion layer 13. The self-fusing seal material 20 or the combination of self-fusing seal material 20 and reinforce layer 19 is formed on the end portion of the solid polymer electrolyte membrane 11 preferably at the position separated from the end of the catalyst layer 12 or gas diffusion layer 13. More desirably, the self-fusing seal material 20 or the combination of self-fusing seal material 20 and reinforce layer 19 is separated from each of the ends of the catalyst layer 12 and gas diffusion layer 13 as shown in FIG. 3 and FIG. 4. In this configuration, the end portions of the catalyst layers and gas diffusion layers are not covered by the self-fusing seal material 20. Accordingly, the catalyst layers and gas diffusion layers can achieve their functions effectively over the entire area.

Figure 5:
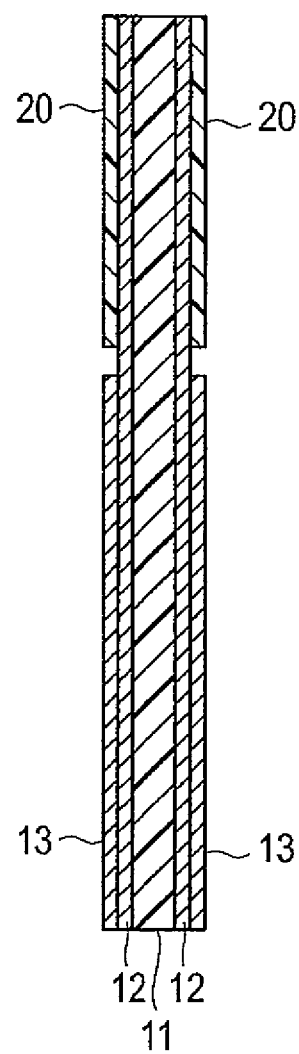
FIG. 5 is an enlarged partial sectional view schematically showing a third preferred embodiment of the placement of the self-fusing seal material in the fuel cell according to the present invention.

In FIG. 5, the self-fusing seal material 20 is disposed on the end portion of catalyst layer 12. No specific limitation is imposed on the thickness of the self-fusing seal material 20. For example, in the case of the membrane electrode assembly including catalyst layers 12 and gas diffusion layers 13, the thickness of the layer of the self-fusing seal material 20 is preferably set substantially equal to the thickness of gas diffusion layer 13. Similarly, in the case of the membrane electrode assembly including only the catalyst layers 12 (including no gas diffusion layers 13), the thickness of the layer of self-fusing seal material 20 is preferably as thin as possible, or the end portion of catalyst layer 12 on which the self-fusing seal material 20 is formed is made thinner so that the total thickness of the self-fusing seal material 20 and the end portion of catalyst layer 12 is substantially equal to the thickness of the rest of catalyst layer 12. In this way, it is possible to make substantially uniform the total thickness of the membrane electrode assembly and hence the total thickness of the lamination of each unit cell of the fuel cell. In the example of FIG. 5, the self-fusing seal material 20 alone is formed on the end portion of the or each catalyst layer 12. However, it is optional to form the reinforcement layer 19 between the layer of self-fusing seal material 20 and the catalyst layer 12 in the same manner as the arrangement shown in FIG. 4.

Figure 6:
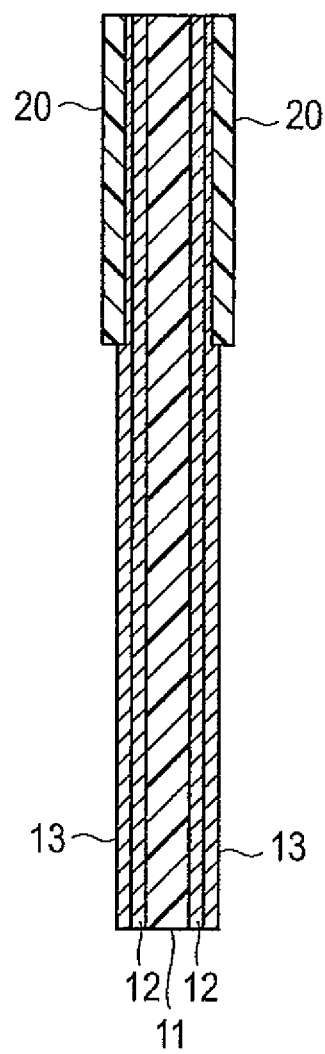
FIG. 6 is an enlarged partial sectional view schematically showing a fourth preferred embodiment of the placement of the self-fusing seal material in the fuel cell according to the present invention.

In FIG. 6, the self-fusing seal material 20 is disposed on the end portion of gas diffusion layer 13. No specific limitation is imposed on the thickness of the self-fusing seal material 20. For example, the thickness of the layer of self-fusing seal material 20 is preferably as thin as possible, or the end portion of gas diffusion layer 13 on which the self-fusing seal material 20 is formed is made thinner so that the total thickness of the self-fusing seal material 20 and the end portion of gas diffusion layer 13 is substantially equal to the thickness of the rest of gas diffusion layer 13. In this way, it is possible to make substantially uniform the total thickness of the membrane electrode assembly and hence the total thickness of the lamination of each unit cell of the fuel cell. In this embodiment, as shown in FIG. 6, the self-fusing seal material 20 may invade or penetrate at least partly into the gas diffusion layer 13. However, because the gas diffusion layer 13 has a porous structure, the self-fusing seal material 20 can invade or penetrate into the gas diffusion layer 13 over the entire depth and thereby improve the sealing performance. In the example of FIG. 6, the self-fusing seal material 20 alone is formed on the end portion of the or each gas diffusion layer 13. However, it is optional to form the reinforcement layer 19 between the layer of self-fusing seal material 20 and the gas diffusion layer 13 in the same manner as the configuration shown in FIG. 4.

Figure 7:
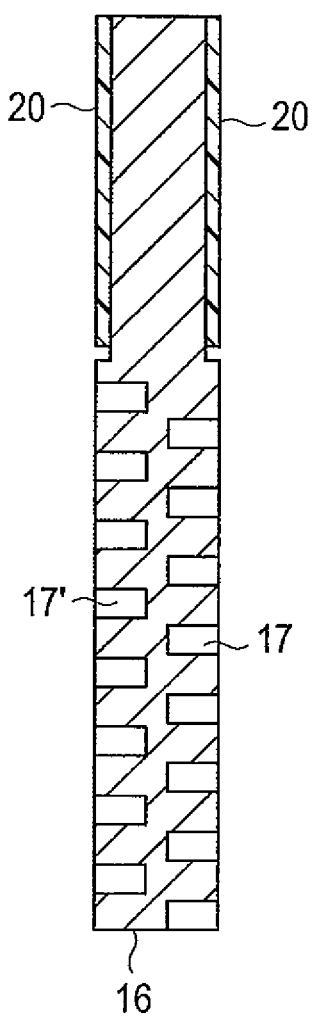
FIG. 7 is an enlarged partial sectional view schematically showing a fifth preferred embodiment of the placement of the self-fusing seal material in the fuel cell according to the present invention.

In FIG. 7, the self-fusing seal material 20 is provided on the end portion of separator 16. No specific limitation is imposed on the thickness of the self-fusing seal material 20. Preferably, the layer of self-fusing seal material 20 has such a thickness as to provide an appropriate clearance between unit cells (the membrane electrode assemblies) in stacking the unit cells (the membrane electrode assemblies). In the case in which the self-fusing seal material is formed to have a thickness to ensure a specific tack characteristic of the self-fusing seal material 20, it is preferable to make thinner the end portion of the separator 16 where the self-fusing seal material 20 is formed, as shown in FIG. 7. With this configuration, in the stack of unit cells (membrane electrode assemblies), it is possible to provide an appropriate clearance between the unit cells (membrane electrode assemblies) and simultaneously to make substantially uniform the thickness of the lamination of the unit cell of the fuel cell. Moreover, the separators can be attached tightly to each other at the time of stacking the unit cells (membrane electrode assemblies). Therefore, it is possible to prevent leakage of gas and cooling water in the passages 17 and 17', and to cause the gas and cooling water to flow efficiently. In the example of FIG. 7, the self-fusing seal material 20 alone is formed on the end portion of the or each separator 16. However, it is optional to form the reinforcement layer 19 between the layer of self-fusing seal material 20 and the separator 16 in the same manner as the configuration shown in FIG. 4.

Among the above-mentioned configurations, the configurations of FIGS. 3-5 and 7 are desirable. The configurations of FIGS. 3, 4 and 7 are more desirable. Specifically, the combination of FIG. 3 or 4 and FIG. 7 is desirable.

The following is explanation on the self-fusing seal material used in the present invention.

In the present invention, the "self-fusing seal material (self-fusing seal layer)" means material or member characterized by adhesion or adhesive joining by developing fusion in a contact interface between materials of the same or similar kinds. The self-fusing seal material is distinguished definitely from the "adhesive agent or adhesive" characterized by adhesive joining by coating the agent to either or both of confronting adherend surfaces, then bringing both in contact with each other and thereafter hardening or curing the agent, and from the "sticking agent" characterized by adhesive joining by coating the agent to either or both of confronting adherend surfaces, then hardening or curing the agent and then bringing both surfaces in contact with each other.

In this invention, the "self-fusing seal material (self-fusing seal layer)" means material or member which is, in addition to the above-mentioned feature, characterized by developing a strong self-fusing property by pressurization while the strong self-fusing property is not developed under low pressure in the contact interface of the adherends. More specifically, a self-fusing force obtained by pressurization at 25° C., 5 kPa for 10 minutes (hereinafter also referred to as the self-fusing force before pressurization) is smaller than 0.01N/mm. The self-fusing force obtained by pressurization at 25° C., 100 kPa for 10 minutes (hereinafter also referred to as the self-fusing force after pressurization) is greater than or equal to 0.05N/mm. The self-fusing force is measure by a T peel test (180 degree peel test) at a peel speed of 50 cm/min. This range is preferable because the position adjusting is possible after provisional lamination of unit cells of a fuel cell, and the strong adhesive force can be obtained by pressurization after the position adjustment, so that the productivity of the fuel cells can be improved.

The self-fusing force after pressurization can be determined by performing the T peel test at the peel speed of 50 cm/min after pressurization at 25 C, 100 kPa for 10 minutes. Preferably, the self-fusing force after pressurization is greater than or equal to 0.1N/mm. The following ranges are preferable in the order of 0.15N/mm or higher, 0.2N/mm or higher, 0.3N/mm or higher, 0.4N/mm or higher, 0.5 N/mm or higher, 1.0N/mm or higher. It is preferable to increase the self-fusing force after pressurization, so that the upper limit is not limited specifically. Preferably, the upper limit of the self-fusing force after pressurization is 1000N/mm.

Examples of the self-fusing seal material are: butyl rubber, polyvinyl chloride, ethylene-propylene rubber, or silicone rubber composition including polyorgano-siloxane and boron compound. Specifically, from the viewpoint of the heat resistance and chemical stability, the silicone rubber composition including polyorgano-siloxane and boron compound is preferable.

No specific limitation is imposed on the silicone rubber composition. It is possible to use known silicone rubber composition such as the composition disclosed in JP H10-120904 A. The following composition is preferable.

(A) 100 parts by mass of polyorgano-siloxane represented by a general formula: RaSiO(4-a)/2 (R represents monovalent hydrocarbon group mutually identical or different, substituted or unsubstituted replaced or unreplaced, a is 1.90~2.70)

(B) 0.1~30 parts by mass of at least one boron compound selected from boric acids, boric acid derivatives, polyorganoborosiloxanes.

(C) 0.1~10 parts by mass of organic peroxide.

Polyorgano-siloxane (A) is a base polymer of the self-fusing seal material. Polyorgano-siloxane is represented by an average composition formula: RaSiO(4-a)/2 (R and a are defined as mentioned above). Examples of R are: alkyl group such as methyl group, ethyl group, n-propyl group, isopropyl group, n-butyl group, n-pentyl group, n-hexyl, n-octyl, and n-decyl; cycloalkyl group such as cyclopentyl group and cyclohexyl group; alkenyl group such as vinyl group and allyl group; aryl group such as phenyl group and naphthyl group; and substituted hydrocarbon group such as chloromethyl group and 1, 1, 1-trifluoropropyl group. In order to obtain good heat resistance, cold resistance and workability as the silicone rubber, excluding the later-mentioned alkenyl group, the concentration of methyl group is preferably 50 mol % or more of the whole of R, and more preferably 85 mol % or more. Specifically, when the resistance to radiation, the resistance to heat and the resistance to cold are required or important, preferably a desired quantity of phenyl group is introduced to the molecule. Especially when the oil resistance and chemical resistance is required or important, preferably a desired quantity of 1,1,1-trifluoro propyl group is introduced to the molecule.

Radicals generated from the organic peroxide of the later-mentioned component (C), in some types of the component (C), can act to the methyl group in the component (A) and form a cross-linking structure, depending on the type of the component (C). However, in order to obtain the silicone rubber having good heat resistance and mechanical properties by causing a wide range of kinds of component (C) to function in a small amount, it is preferable to use R containing a certain amount of the alkenyl group, especially the vinyl group. Preferably, the contained amount of the vinyl group is less than or equal to 1 mol % in view of the heat resistance of polyorganosiloxane. A more desirable range is 0.02~0.2 mol %. A configuration in which a polymer end is closed by a group including a silanol group, such as dimethylhydroxysilyl is preferable since a good self-fusing property can be obtained.

A is in the range of 1.90~2.70. A more desirable range is 1.99~2.01.

The boron compound of the component (B) is a constituent providing the self-fusing property after hardening, to the silicone rubber composition. Examples of component (B) are: boric acids such as anhydride boric acid, pyroboric acid, and orthoboric acid; derivative of boric acid or anhydride boric acid, such as trimethyl borate, triethyl borate, trimethyl borate, triethoxy borate, and trimethoxyboroxin; and polyorganoborosiloxane, such as polymethylborosiloxane, including boroxane coupling introduced into polysiloxane chain. Polyorganoborosiloxane can be obtained by condensation, by heating, of organoalkoxysilane such as dimethyldimethoxysilane and dimethyldiethoxysilane, and anhydrous boric acid. It is possible to employ one kind of these or to combine two or more kinds. In view of the compatibility with polyorganosiloxane of the component (A), polyorganoborosiloxane is preferable.

The blending quantity of component (B) is preferably 0.1~30 parts by mass with respect to 100 parts by mass of component (A). More desirably, the blending quantity of component (B) is 1~15 mass parts. In the range smaller than 0.1 parts by mass, the self-fusing property might not developed after hardening. In the range greater than 30 parts by mass, the silicone rubber obtained by hardening might be insufficient in heat resistance, and lower in mechanical properties.

The organic peroxide of component (C) is a hardening or curing agent causing a cross-linking reaction of component (A) by producing radicals by heating, and thereby hardens or cures the self-fusing silicone rubber composition. Examples of the organic peroxide are: acyl type peroxide such as benzoyl peroxide, bis (p-chlorobenzoyl) peroxide and bis (2,4-dichlorobenzoil) peroxide; alkyl type peroxide such as di-tert-buthyl peroxide, 2, 5-dimethyl-2, 5- di (tert-buthyl peroxy) hexane, tert-buthylcumyl peroxide, dicumyl peroxide; and ester type organic peroxide such as tert-buthylperoxybenzoate.

The usage quantity of component (C) is preferably 0.1~10 parts by mass with respect to 100 parts by mass of component (A). A more desirable range is 0.3~5 parts by mass. For safe and easy treatment, the component (C) may be in the form of paste formed by mixing with silicone oil or blend formed by adsorption to inorganic fine powder.

Besides the above-mentioned boron compound, a tin compound (D) may be included. The tin compound is a component to improve the self-fusing property and to prevent a so-called "catch cold phenomenon" which is a phenomenon in which the self-fusing property becomes lower by a long time process under moisture or damp or high temperature. Examples of the tin compound are: tin oxide such as stannic oxide; organic tin salt such as stannous butyrate, stannous octoate, stannous decanoate, stannous naphthenate, stannous octenoate, and stannous oleate; and organic tin compound including hydrocarbon group coupled directly with tin atom, a such as dibutyltin diacetate, dibutyltin dioctoate, dibutyltin di-2-ethylhexoate, dibutyltin dilaurate, dibutyltin dimethylate and dimethyltin dioxide. In view of the compatibility with polyorganosiloxane of component (A), a preferable example is tin compound useful as condensation catalyst of a room temperature vulcanizable silicone rubber.

The usage quantity of the tin compound in the case of use of the tin compound is preferably 0.01~10 parts by mass with respect to 100 parts by mass of component (A). A more desirable range is 0.1~5 parts by mass. In the range smaller than 0.01 parts by mass, the effect of restraining the "catch cold phenomenon" may be eliminated in some cases. In the range exceeding 10 parts by mass, the tin compound might impede the curing of the silicone rubber. Moreover, the cured silicone rubber might be insufficient in heat resistance and might be lower in mechanical properties.

According to the need, it is optional to blend inorganic filler to the self-fusing silicone rubber composition. The inorganic filler is intended to provide required stiffness and mechanical properties to the silicone rubber composition. Examples are: reinforcing filler such as fumed silica, silica aerogel and precipitated silica; and non-reinforcing filler such as quartz powder, fused silica, diatomous earth, calcium carbonate, titanium oxide, ferric oxide, ferrite and carbon. It is possible to use one of these singularly, or two or more of these in combination.

The inorganic filler can be blended appropriately in consideration of physical properties of the rubber obtained after curing, and various properties to be imparted to the rubber. Generally, it is preferable to blend the inorganic filler to an upper limit of 1,000 parts by mass with respect to 100 parts by mass of component (A). In consideration of the workability, a more desired range of blending is 1~500 parts by mass.

It is optional to mix, into the silicone rubber composition, various ingredients known as compounding ingredients to the silicone rubber, such as pigment, heat resistance improving agent, antioxidizing agent or antioxidant, processing aid and organic solvent. Furthermore, in order to prevent pseudo cross linking, it is optional to mix alcohol such as methanol, ethanol, isopropyl alcohol, propylene glycol, and glycerin.

The silicone rubber composition can be prepared by cold kneading or hot kneading with a kneading machine such as banbury mixer, kneader, or roll. The components (A)~(D) and the optional inorganic filler can be blended in an arbitrary order of blending or compounding. In the case of hot kneading with heating, it is preferable to add the component (B), (C) and (D) after the mixture is cooled after the hot kneading.

As the silicone rubber composition, it is optional to use a commercial product a commercially available product. Examples of the commercial product are: SE6770 U silicone rubber compound produced by Toray Dow Corning silicone Co. Ltd. It is possible to use any of silicone rubber compositions known in the art.

The self-fusing force or self-fusing adhesive force before pressurization of the self-fusing seal material used in the present invention is preferably smaller than 0.01N/mm. A more desirable range is smaller than 0.001N/mm. More desirably, the self-fusing seal material has no self-fusing force (0 N/mm, that is) before pressurization. The self-fusing force before pressurization can be measured by T-shaped peeling test at a peeling speed of 50 cm/min after pressurization at 5 kPa at 25° C. for 10 minutes. A pressure of 5 kPa is applied on the assumption of pressure applied by its own weight when a considerable number of unit cells of the fuel cell are provisionally stacked. Preferably, the self-fusing seal material according to the present invention does not show a self-fusing property when the self-fusing seal material is pressed against a confronting self-fusing seal material at least with a pressure corresponding to its own weight.

Preferably, a ball tack at 23° C., of the self-fusing seal material used in the present invention is lower than or equal to 3. The ball tack is a ball tack value measured by J. Dow method specified by JIS Z0237: 2009. The ball tack becomes greater as the tack property or tackiness becomes stronger. The ball tack is preferably smaller than or equal to 2. More desirably, the ball tack is smaller than or equal to 1. Null ball tack (ball tack is equal to zero) is especially desirable.

It is known that a typical self-fusing material develops a strong fusing adhesive force merely by contact at room temperature with no pressure (less than 1 kPa). However, it is possible to design so as to develop a desirable physical property of the self-fusing seal material by employing technique (as disclosed in JP 2566304 B2) forming, in a surface layer, a tack preventing layer to prevent contact between self-fusing materials under low pressure. Moreover, technique of dispersing microcapsules enclosing plasticizer in a base material layer lower in the self-fusing property (as disclosed in JP H06-172725 A) is effective for developing a desired physical property of the self-fusing seal material. Furthermore, it is possible to adjust the self-fusing force and tackiness before pressurization and the self-fusing force after pressurization within a desirable range by attaching an additive agent to the surface of self-fusing seal material. No limitation is imposed on the additive agent as long as the additive agent can adjust the self-fusing force and tackiness before pressurization and the self-fusing force after pressurization within the desirable range. It is preferable to use, as the additive agent, fine power and fine fibers of alumina and silica. Use of alumina powder and silica powder is more desirable. By using such the additive agent of such a type adhering to the self-fusing seal material surface, it is possible to adjust the self-fusing force and tackiness before pressurization and the self-fusing force after pressurization within the desirable range. The blending quantity (coating quantity) of the additive agent is not limited as long as the above-mentioned effect is achieved. The blending quantity is determined appropriately in dependence on the kind of the additive agent. Though no limitation is imposed on the average particle or grain size of powder when the additive agent is in the form of fine powder, the average particle size is preferably greater than or equal to 0.001 μm. A more desirable range is equal to or greater than 0.01 μm. A range equal to or greater than 0.02 μm is still more desirable. In the case of use of fine powder as the additive agent, the upper limit of the average particle diameter is preferably equal to smaller than the thickness of the self-fusing seal material. A range equal to or smaller than 10 μm is more desirable. A range equal to or smaller than 5 μm is still more desirable. A range equal to or smaller than 1 μm is especially desirable. Thus, in the case of the additive agent in the form of fine powder, a desirable range of the average grain diameter is 0.001~10 μm. A more desirable range is 0.01~5 μm. A still more desirable range is 0.02 μm~1 μm. It is possible to assume that the additive agent functions to impede the self-fusion by intervening between the self-fusing seal materials at low pressures, and to enable development of the self fusion by being retracted in the self-fusing seal material at high pressures. It is possible to attach the additive agent to at least one surface of the confronting self-fusing materials.

In the present invention, as to members forming MEA and PEFC other than the self-fusing seal material, it is possible use construction known in the field of the fuel cell without modification or with appropriate modification. The following is explanation on elements constituting MEA and PEFC. However, the invention is not limited to the following modes.

(Solid Polymer Electrolyte Membrane)

The solid polymer electrolyte membrane is composed of polymer electrolyte having proton conductivity, and has a function to cause protons generated in the anode catalyst layer at the time of operation of the solid polymer fuel cell, to permeate selectively to the cathode catalyst layer in the direction of the membrane thickness. Moreover, the solid polymer electrolyte membrane has a function as a partition to prevent mixing of the fuel gas supplied to the anode side and the oxidizing gas supplied to the cathode side.

No specific limitation is imposed on the structure of the solid polymer electrolyte membrane. It is possible to employ membranes of polymer electrolytes known in the technical field of the fuel cells. Solid polymer electrolyte membranes are classified into fluorine solid polymer electrolyte membranes and hydrocarbon solid polymer electrolyte membranes according to the kinds of constituent polymer electrolytes.

Examples of polymer electrolytes constituting the fluorine solid polymer electrolyte membrane are: perfluorocarbonsulfonic acid type polymer such as nafion (registered trademark, product of Dupont), aciplex (registered trademark, product of Asahi Kasei corporation) and flemion (registered trademark, product of Asahi Glass Co. Ltd.), perfluorocarbon phosphorous acid type polymer, trifluorostyrenesulfonic acid type polymer, ethylenetetrafluoroethylene-g-styrenesulfonic acid polymer, ethylene-tetrafluoroethylene copolymer and polyvinylidene fluoride-perfluorocarbon sulfonic acid type polymer. In view of the power generating properties such as heat resistance and chemical stability, use of these fluorine polymer electrolyte membranes is desirable. Use of fluorine polymer electrolyte membrane made up from perfluorocarbonsulfonic acid type polymer is more desirable.

Examples of polymer electrolyte constituting hydrocarbon based solid polymer electrolyte membrane are: sulfonated polyethersulfone (S-PES), sulfonated polyaryl ether ketone, sulfonated polybenzimidazolealkyl, phosphonated polybenzimidazolealkyl, sulfonated polystyrene, sulfonated polyetheretherketone (S-PEEK) and sulfonated polyphenylene (S-PPP). Use of these hydrocarbon based polymer electrolyte membranes is desirable from production viewpoints such as inexpensive raw materials, easy and convenient production process, and wide selections of materials. It is possible to use only one or two or more in combination, of the above-mentioned ion exchange resins (sic).

It is optional to use, as the polymer electrolyte, material other than the polymer electrolytes constituting the above-mentioned solid polymer electrolyte membranes. For example, liquid, solid and gel materials having high proton conductivity are usable. Examples are: solid acids of phosphoric acid, sulfuric acid, antimonic acid, stannic acid and heteropoly acid; hydrocarbon polymer doped with inorganic acid such as phosphoric acid; organic/inorganic hybrid polymer partly replaced by proton conductive functional group; and gel-like proton conductive material including polymer matrix impregnated with phosphoric acid solution or sulfuric acid solution. It is possible to use, as the polymer electrolyte, mixed conductor having proton conductivity and electron conductivity.

The thickness of the solid polymer electrolyte membrane can be determined appropriately in consideration of characteristics of the membrane electrode assembly and polymer electrode, without no specific limitation. However, a desirable range of the thickness of the solid polymer electrode electrolyte membrane is 5~300 µm. A more desirable range is 5~200 µm. A still more desirable range is 10~150 µm. A specifically desirable range is 15~50 µm. With the thickness within these ranges, it is possible to control the balance among the strength at the time of forming the membrane, the durability during use, and the output characteristic during use.

(Catalyst Layers)

There are the anode catalyst layer and the cathode catalyst layer. Hereinafter, "catalyst layer" is simply used when no distinction is made between the anode catalyst layer and cathode catalyst layer. The catalyst layers have a function to produce electric energy through electrochemical reaction. The anode catalyst layer generates protons and electrons by the oxidation reaction of hydrogen. Protons and electrons generated in the anode catalyst layer are used for the reduction reaction of oxygen in the cathode catalyst layer.

The catalyst layers include an electrode catalyst having a conductive carrier supporting catalyst component, and a polymer electrolyte. It is possible to employ any of catalyst layer configurations known in the technical field of the fuel cell, with no specific limitation.

(Conductive Carrier)

The conductive carrier is a carrier supporting the catalyst component, and having electric conductivity. The conductive carrier is required to have a specific surface area sufficient to carry the catalyst component in a desirable dispersed state, and to have a sufficient electron conductivity. As to the composition of the conductive carrier, a preferable main component is carbon. Examples of the material of conductive carrier are: carbon black, activated carbon, coke, natural graphite and artificial graphite. The expression, "main component is carbon" means that the material includes carbon as a main component, and includes both of the meaning that only carbon atoms are included, and the meaning that it is made up substantially of carbon atoms. In some cases, in order to improve a characteristic of the fuel cell, an element or elements other than carbon atoms may be included. The expression "it is made up substantially of carbon atoms" means that inclusion of impurities in an amount smaller than or equal to about 2~3 mass % is allowable.

No special limitation is imposed on the BET (Brunauer-Emmet-Teller) specific surface area of the conductive carrier as long as the catalyst component can be supported in a highly dispersed state. However, a desirable range is 100~1500 m2/g. A more desirable range is 600~4000 m2/g. Within these ranges, it is possible to adequately control the balance between the dispersion of the catalyst component on the conductive carrier and the rate of effective utilization of the catalyst component.

Though no special limitation is imposed on the average particle diameter of the conductive carrier, normally the average particle diameter is in a range of 5~200 nm. A preferable range is about 10~100 nm. As the average particle diameter of the conductive carrier, values obtained by a primary particle diameter measuring method by a transmission electron microscope (TEM) are employed.

(Catalyst Component)

The catalyst component has a function to perform catalytic action in the electrochemical reaction. The catalyst component carried on the conductive carrier is not limited as long as the above-mentioned catalytic action can be performed to promote the electrochemical reaction. It is possible to employ known catalysts appropriately. Examples of the catalyst components are: metals such as platinum, ruthenium, iridium, rhodium, palladium, osmium, tungsten, lead, iron, chrome, cobalt, nickel, manganese, vanadium, molybdenum, gallium, and aluminum, and alloys of these metals. Preferably, the catalyst component includes at least platinum in view of good catalytic activity and resistance to elution. In the case of alloy employed as the catalyst component, the composition of the alloy can be selected appropriately by a person skilled in the art in dependence on the kinds of metals in the alloy. Preferably, the platinum content is about 30~90 at % and the content of other metal or metals in the alloy is about 10~70 at %. In general, an alloy is material having metallic properties, obtained by adding, to one metal element, one or more metallic elements or non-metal. The structure of the alloy may be eutectic alloy which is a mixture of constituent elements in different crystals, a solid solution in which constituent elements are blend in completely, and a compound formed by constituent elements such as intermetallic compound and a compound of metal and non-metal. Any of these structures can be employed in the present invention. It is possible to determine the alloy structure by using ICP optical emission spectrometry.

No special limitation is imposed on the shape and size of the catalyst component. It is possible to employ the shape and size of known catalyst components. A preferable shape of the catalyst component is granular. The average particle diameter of catalyst component particles is desirably in a range of 0.5~30 nm, and more desirably in a range of 1~20 nm. Within these ranges, it is possible to properly control the balance between the catalyst utilization rate relating to the area of effective electrode surface on which the electrochemical reaction proceeds, and the ease of the support of the carrier. The average particle diameter of the catalyst component particles can be calculated as an average value of a crystallite diameter determined from a full width at half maximum of diffraction peak of the catalyst component particles in X-ray diffraction analysis and a particle diameter of the catalyst component obtained from images of the transmission electron microscope.

No limitation is imposed on the ratio of the conductive carrier content and the catalyst component content in the electrode catalyst. The content percentage of the catalyst component (supported quantity) is preferably in a range of 5~70 mass % with respect to the total mass of the electrode catalyst. A more desirable range is 10~60 mass %, and a still more desirable range is 30~55 mass %. When the content rate of the catalyst component is equal to or greater than 5 mass %, the catalyst component can perform the catalyst function of the electrode catalyst sufficiently, and hence contributes to improvement in the power generating performance of the solid polymer fuel cell. When the content rate of the catalyst component is equal to or smaller than 70 mass %, agglomeration of catalyst component on the surface of the conductive carrier is restrained, and the catalyst component is supported in a desirable higher dispersed state. The above-mentioned ratio of the contents is determined by using values measured by the ICP optical emission spectrometry.

(Polymer Electrolyte)

The polymer electrode has a function of improving the proton conductivity of the catalyst layer. As to the configuration of the polymer electrolyte included in the catalyst layer, knowledge known in the technical field of the fuel cell can be used appropriately without limitation. For example, as the polymer electrolyte included in the catalyst layer, it is possible to use the polymer electrolyte forming the above-mentioned solid polymer electrolyte membrane. Accordingly, repetition of detailed explanation about the polymer electrolyte is omitted here. The polymer electrolyte included in the catalyst layer may include only one kind or may include two or more kinds.

The ion exchange capacity of the polymer electrolyte included in the catalyst layer is preferably in a range of 0.8~1.5 mmol/g from the viewpoint of good ion conductivity. A more desirable range is 1.0~1.5 mmol/g. The ion exchange capacity of the polymer electrolyte means a number of moles of sulfonic acid group per unit dry mass in the polymer electrolyte. It is possible to determine a value of the ion exchange capacity by preparing a solid polymer electrolyte by removing a dispersion medium from a polymer electrolyte dispersion liquid by drying by heat, and performing neutralizing titration of the solid polymer electrolyte.

No limitation is imposed on the polymer electrolyte content in the catalyst layer. However, the mass ratio of the quantity of the polymer electrolyte to the quantity of the conductive carrier in the catalyst layer (the mass ratio equaling the polymer electrolyte content/the conductive carrier content) is preferably in a range of 0.5~2.0. A more desirable range is 0.6~1.5. A still more desirable range is 0.8~1.3. The condition that the mass ratio of the polymer electrolyte/conductive carrier is equal to or greater than 0.8 is desirable from the viewpoint of restraint of the internal resistance of the membrane electrode assembly. The condition that the mass ratio of the polymer electrolyte/conductive carrier is equal to or smaller than 1.3 is desirable from the viewpoint of restraint of flooding.

It is optional to add water repellent and various other additives in the form of coating or inclusion, to each catalyst layer, specifically to the conductive carrier surface and the polymer electrolyte. With the addition of water repellent, it is possible to enhance the water repellant property of the catalyst layer, and to discharge water produced at the time of power generation promptly. The mixed quantity of the water repellent can be determined appropriately within a range exerting no influence on the operations and effects of the present invention. As the water repellent, it is possible to use the above-mentioned example desirably.

Though there is no specific limitation, the thickness of the catalyst layer according to the present invention is preferably in a range 0.1~100 μm. A more desirable range is 1~20 μm. The condition that the thickness of the catalyst layer is equal to or greater than 0.1 μm is desirable in the point of obtaining a desired quantity of power. The condition that the thickness of the catalyst layer is equal to or smaller than 100 μm is desirable in the point of maintaining high output.

The membrane electrode assembly can be produced by forming the anode side catalyst layer and cathode side catalyst layer on both sides of the solid polymer electrolyte membrane by a known method, and sandwiching the thud-obtained lamination between gas diffusion layers formed by the above-mentioned method.

The catalyst layers can be produced by coating catalyst ink made up of the electrode catalyst, polymer electrolyte and solvent, on the solid polymer electrolyte membrane by a known method such as spraying, transfer method, doctor blade method and die coater method.

The quantity of catalyst ink coating on the solid polymer electrolyte membrane is not limited as long as the electrode catalyst can perform the operation of catalyzing the electrochemical reaction sufficiently. Preferably, the coating is performed so that the mass of the catalyst component per unit area is in a range of 0.05~1 mg/cm2. The thickness of the coated catalyst ink after drying is preferably in a range of 5~30 μm. The coating quantity and coating thickness need not be the same between the anode side and the cathode side. It is possible to adjust the coating quantity and thickness individually for the anode side and the cathode side.

(Gas Diffusion Layers)

A pair of the gas diffusion layers are so disposed that MEA composed of the above-mentioned electrolyte membrane and cathode layers is sandwiched between the gas diffusion layers. The gas diffusion layers function to promote the diffusion, to the catalyst layers, of the gas (the fuel gas on the anode side; the oxidizing gas on the cathode side) supplied through the later-mentioned gas passage of the separators, and serve as the electron conduction path.

The material forming the base material of the gas diffusion layers is not limited, and knowledge known in the art can be used. Examples are: sheet materials having conductivity and porosity, such as fabric of carbon product, paper-shaped product of paper making, felt, and nonwoven fabric. The thickness of the base material can be determined appropriately in consideration of characteristics of the resulting gas diffusion layer. A desirable range is 30~500 μm. With the base material having the thickness in this range, it is possible to control the balance between the mechanical strength and the diffusivity of gas and water.

Preferably, a hydrophilic surface treatment is performed to the gas diffusion layers. The gas diffusion layers processed by the hydrophilic treatment can promote discharge of excess amount of water existing (or flowing) in the catalyst layers, and prevent flooding phenomenon effectively. Examples of the hydrophilic treatment applied to the gas diffusion layers are: coating of titanium oxide to the carbon base material surface and treatment of modifying the carbon base material surface with acid functionality. These examples are not limiting. It is possible to employ other hydrophilic treatments.

Moreover, in order to promote discharge of excessive water existing in or on the catalyst layers and to prevent occurrence of the flooding phenomenon, the gas diffusion layers may have a microporous layer (carbon particle layer) containing carbon particles, on the catalyst layer's side of the base material.

As the carbon particles included in the microporous layer (carbon particle layer), it is possible to employ known material such as carbon black, graphite, and expanded graphite without special limitation. Specifically, carbon black such as oil furnace black, channel black, lamp black, thermal black and acetylene black is preferable because of superior electron conductivity and great specific surface area. Preferably, the average particle diameter of carbon particles is 10~100 nm. With the average carbon particle diameter in this range, it is possible to obtain high drainage performance by capillary force and to improve the contact with the catalyst layer.

The microporous layer (carbon particle layer) may contain water repellant. Examples of the water repellant are: fluorine type polymer such as polytetrafluoroethylene (PTFE), polyvinylidene fluoride (PVdF), polyhexafluoropropylene and copolymer of tetrafluoroethylene and hexafluoropropylene (FEP); polypropylene; and polyethylene. Because of the superior water repellancy property and corrosion resistance at the time of electrode reaction, use of the fluorine type polymer is preferable.

(Separator)

A unit cell of PEFC is formed by MEA sandwiched between separators. In general, PEFC is in the form of a stack structure including a plurality of unit cells connected in series. In this case, the separator has a function to connect the MEAs electrically in series, a function to provide fluid passages and a manifold to covey different fluids such as the fuel gas, oxidizing gas and cooling medium, and a function to retain the mechanical strength of the stack.

As the material of the separators, it is possible to utilize knowledge known in the art appropriately with no special limitation. Examples are: carbon material such as dense carbon graphite, and carbon plate; and metallic material such as stainless alloy. It is possible to determine the size of the separator and the shape of the fluid passages appropriately in consideration of the output characteristic of PEFC, with no special limitation.

(Gasket)

Gasket is disposed around the fuel cell so as to surround the pair of catalyst layers and the pair of gas diffusion layers. Gasket has a function to prevent leakage to the outside, of gas supplied to the catalyst layers. The gas diffusion electrode is an assembly of gas diffusion layer and catalyst layer (sic). The material of the gasket is not limited. Examples of the gasket are: rubber material such as fluoro rubber, silicone rubber, ethylene propylene rubber (EPDM), polyisobutylene rubber; fluorine type polymer material such as polytetrafluoroethylene (PTFE), polyvinylidene fluoride (PVDF), polyhexafluoropropylene and copolymer of tetrafluoroethylene and hexafluoropropylene (FEP); and thermoplastic resin such as polyolefin and polyester. There is no special limitation on the thickness of the gasket. A desirable range of the thickness of the gasket is 50 μm~2 mm. A more desirable range is 100 μm ~1 mm.

No special limitation is imposed on the type of the fuel cell. In the preceding explanation, the polymer electrolyte type fuel cell is employed as an example. Other examples which can be used are: alkaline fuel cell, direct methanol fuel cell, and micro fuel cell. Specifically, the polymer electrolyte fuel cell is preferable from the viewpoint of the possibility of small size, high density and higher output. The fuel cell is useful as a stationary power source, as well as a power source for a mobile object or transportation, such as a power source for a vehicle limited in the installation space. The fuel cell can be used preferably for motor vehicles requiring frequent occurrences of start/stop and output changes of the system.

(Production Method of the Fuel Cell)

The production or manufacturing method of the fuel cell according to the present invention comprises (1) a coating step of coating a self-fusing seal material on an end portion of at least one member selected from the group consisting of an electrolyte membrane, gas diffusion layer or layers, and separator or separators; (2) a hardening or curing step of hardening or curing the self-fusing seal material; (3) a laminating step of forming a lamination or laminated body by superposing a membrane electrode assembly including the electrolyte membrane and the gas diffusion layer(s), and the separator(s); and (4) a fusing step of pressurizing the lamination for fusing. The following is explanation on the production method, step by step. The present invention is not limited to the following embodiments and practical examples.

(1) Coating step of coating the self-fusing seal material on an end portion of at least one member selected from a group consisting of the electrolyte membrane, membrane electrode assembly (sic) and separator(s).

At this step, the self-fusing seal material is coated to an end portion of at least one selected from the group consisting of the electrolyte membrane, the membrane electrode assembly and separator(s).

As the coating method of the self-fusing seal material, it is possible to employ conventional coating methods with no special limitation. Examples are: coating with dispenser, gravure coater, knife coater, lip coater or bar coater; screen printing or flexo printing.

The coating quantity of the self-fusing seal material is preferably in a range equal to or greater than 2 g/m2. A more desirable range is equal to or greater than 10 g/m2. A still more desirable range is equal to or greater than 20 g/m2. A specifically desirable range is equal to or greater than 30 g/m2. Though no upper limit is set, the seal may become too thick when the coating quantity exceeds 1000 g/m2. Within the above-mentioned ranges, it is possible to attach the seal to an adherend surface adequately by fusion.

(2) Hardening or curing step of hardening or curing the self-fusing seal material.

With consideration for protecting the coating surface of the self-fusing seal material against contact with other material, this step is started, and the self-fusing seal material is hardened or cured by means of drying by heating or irradiation. The hardened self-fusing seal material shows almost no fusing adherence or tack property between different materials and under a contact pressure equal to or lower than 5 kPa between identical materials. Therefore, it is possible to form the member coated with the self-fusing seal material into a roll shape, to store temporarily in a stocker by cutting the member coated with the self-fusing seal material, and to enable design and construction of production line for various fuel cells.

The hardening or curing temperature for hardening the material by heat drying is preferably lower than or equal to 120° C., and more desirably lower than or equal to 110° C. Though there is no special limitation on the lower limit of the hardening temperature, a desirable range is equal to or higher than 20° C. A more desirable range is equal to or higher than 40° C.

The hardening or curing time is preferably equal to or shorter than 1 hour. More desirably, the hardening or curing time is equal to or shorter than 10 minutes. No special lower limit is set on the hardening or curing time.

(3) The laminating step of forming a lamination or laminated body by laminating the membrane electrode assembly including the electrolyte membrane and gas diffusion layer(s), and separator(s).

At this step, the membrane electrode assembly including the electrolyte membrane and gas diffusion layer(s), and separator(s) are superposed one by one. The self-fusing seal material is provided in the end portion of at least one selected from the group consisting of the electrolyte membrane, gas diffusion layer(s) and separator(s). Though the number of layers laminated in the lamination differs in dependence on the intended purpose of the fuel cell, the number of layers is generally equal to several tens for the stationary application, and several hundred for the motor vehicles. As mentioned before, the self-fusing seal material used in the present invention shows almost no fusing adherence or tack property between different materials and under a contact pressure equal to or lower than 5 kPa between identical materials. Therefore, the position adjustment is possible after provisional lamination or stacking of unit cells. As the method for position adjustment, there is an example of aligning parts by means of vibrations, gravitational force etc., by setting flat plate to the outer circumference portion of a provisionally laminated fuel cell stack.

(4) Step of Pressurizing and Fusing the Lamination.

At this step, the lamination or laminated body is pressurized in the laminating direction with a pressure equal to or higher than 10 kPa. With this pressurization, a strong self-fusing adhesive force is produced between the self-fusing seal materials, and the fuel cell stack is completed. In accordance with the intended purpose, it is possible to heat the fuel cell stack to improve the self-fusing force desirably at a temperature of 100° C. or lower, more desirably at a temperature of 80° C. or lower. Though a lower limit is not set for the fusing temperature, the temperature for fusion is desirably equal to or higher than 20° C., and more desirably equal to or higher than 40° C.

The pressure in the pressurizing operation is equal to or higher than 10 kPa, desirably equal to or higher than 50 kPa, more desirably equal to or higher than 200 kPa, and more desirably equal to or higher than 500 kPa. A pressure range equal to or higher than 1 MPa is specifically preferable. It is possible to use a higher pressure when a higher pressure is desired to reduce the contact resistance in the fuel cell. No special upper limit is set for the pressure. The pressure of the pressurizing operation is in a pressure range not breaking or damaging the structure of the lamination (the membrane electrode assembly).

(Vehicle)

A vehicle equipped with the fuel cell according to the present invention is also included in the technical scope of the present invention. The fuel cell according to the present invention is suitable for application for vehicle because of its superior power generating performance and durability.

The following is more concrete explanation on the present invention with reference to practical examples. However, the technical scope of the present invention is not limited to the following practical examples.

Practical Example 1

A membrane electrode assembly having the structure of FIG. 2 was produced in the following process.

(1) Formation of a Self-Fusing Seal Material (Self-Fusing Seal Layer) on a PET Film.

A PET film (0.1 mm) processed by a surface plasma treatment is cut to obtain a PET film of 70mm×70 mm, having an opening of 50 mm×50 mm at the center. The outer circumference portion of this PET film is coated by the dispenser method, with a self-fusing seal material (SE6770U produced by Toray Dow corning silicone CO. Ltd.: 100 parts by mass, dicumyl peroxide: 2 parts by mass, triethoxyborane: 5 parts by mass) having a width of 10 mm and a thickness of 20 μm and including polyorganosiloxane and boron compound. Thereafter, alumina powder having an average particle diameter of 0.5 μm is attached to the coating surface, in a quantity of 0.9 g/m2.

The ball tack of the self-fusing seal material on the PET film is zero. Moreover, the self-fusing seal materials are overlapped so as to confront each other and pressure is applied at a surface pressure of 5 kPa at 25° C. for 10 minutes. In this case, the self-fusing adhesive force is equal to or smaller than 0.005N/mm. The self-fusing force is measured by the T-shaped peel test at a peeling speed of 50 cm/min.

(2) Production of a Three-Layer Lamination [CCM(1)] of Catalyst Layer-Electrolyte Membrane-Catalyst Layer.

Onto both surfaces of the electrolyte membrane (Nafion (Registered trademark), 211, product of Dupont) cut in the shape of 70×70 mm, the above-mentioned PET films are attached so that the coating surface faces outwards. By the ink jet method, a platinum supporting carbon electrode (48 mm×48mm) is coated on the opening portion of each of the both surfaces, and thereby, a CCM of the catalyst layer-electrolyte membrane-catalyst layer (the PET film is provided in the outer peripheral portion of each side) is produced. Thus, the CCM(1) is produced. The thus-produced CCM(1) includes the catalyst layers 12 formed on both sides of the electrolyte membrane 11 (anode catalyst layer and cathode catalyst layer), and the reinforcing layer 19 and the self-fusing seal material 20 are formed on an end portion of the electrolyte membrane 11.

When several CCMs are overlapped so that the self-fusing seal materials confront each other, and adjusted to align the end surfaces by holding the several CCMs with both hands and dropping the several CCMs onto a desk. In this case, the CCMs can be adjusted without fusion, to a correctly arranged pack or deck.

(2') Production of a Three-Layer Lamination [CCM(2)] of Catalyst Layer-Electrolyte Membrane-Catalyst Layer.

The self-fusing seal material is produced in the same manner as in the above-mentioned process (1) except that the alumina powder is not attached.

Then, a CCM of the catalyst layer-electrolyte membrane-catalyst layer (the PET film is provided in the outer peripheral portion of each side) is produced in the same manner as in the process (2) except that the self-fusing seal material produced in (2') is used. Thus, the CCM(2) is produced. The thus-produced CCM(2) includes the catalyst layers 12 formed on both sides of the electrolyte membrane 11 (anode catalyst layer and cathode catalyst layer), and the reinforcing layer 19 and the self-fusing seal material 20 are formed on an end portion of the electrolyte membrane 11. The thus-produced CCM(2)s are superposed so that the self-fusing seal materials confront each other, and the resulting lamination is pressurized at 100 kPa, 25° C., for 10 minutes. Thereafter, the T-shaped peel test is performed at a peeling speed of 50 cm/min, and the self-fusing adhesive force after pressurization is equal to 0.35 N/mm.

(3) Formation of the Self-Fusing Seal Material (Self-Fusing Seal Layer) on the Separator(s).

A separator is prepared by coating an outer circumferential portion of an aluminum separator (0.1 mm thick) subjected to sand blast and cut in the form of 70×70 mm, with a self-fusing seal material (SE6770U produced by Toray Dow coming silicone CO. Ltd.: 100 parts by mass, dicumyl peroxide: 2 parts by mass, triethoxyborane: 5 parts by mass) having a width of 10 mm and a thickness of 20 nm and including polyorganosiloxane and boron compound, by the dispenser method.

Two separators are superposed so that the self-fusing seal materials confront each other, and the resulting lamination is pressurized at 100 kPa, 25° C., for 10 minutes. Thereafter, the T-shaped peel test is performed at a peeling speed of 50 cm/min, and the self-fusing adhesive force after pressurization is equal to 0.41N/mm.

(4) Fusion of CCM, Gas Diffusion Layers and Separators

As the gas diffusion layer, a commercially available GDL (produced by SGL carbon company: 25BC) cut in a form of 50×50 mm is used. A lamination is formed by superposing the separator obtained by the above-mentioned process (3), the above-mentioned gas diffusion layer, CCM(1) produced by the process (2), the above-mentioned gas diffusion layer, and the separator obtained by the process (3) in the order of mention. Thus, the lamination (fuel cell) 10 is produced. As shown in FIG. 2, the thus-produced lamination 10 includes the catalyst layers 12 (the anode catalyst layer and cathode catalyst layer) and the gas diffusion layers 13 formed, respectively, on both sides of the electrolyte membrane 11, the reinforcing layer 19 and self-fusing seal material 20 formed on an end portion of the electrolyte membrane 11, and separators 16 disposed on both sides of CCM(1) and provided with the self-fusing seal material 20 in an end portion.

When two of the above-mentioned laminations are overlapped so that the self-fusing seal materials confront each other, and adjusted to align the end surfaces by holding the laminations with both hands and dropping the laminations onto a desk. In this case, the laminations can be adjusted without fusion, to a correctly arranged pack or deck.

Thereafter, the confronting self-fusing seal materials are caused to adhere strongly to each other by pressurization at 0.1 MPa, 25° C., for 10 minutes. A T-shaped peel is tried with a force of 0.2 N/mm, but it is not possible to achieve peeling or detachment. Therefore, the lamination obtained by this practical example has an after-pressurization self-fusing adhesive force of 0.2 N/mm at least.

Practical Example 2

(1) Formation of A Tack Preventing Layer on a Self-Fusing Seal Material Surface.

As a tack preventing layer additive, 0.01 g of alumina powder (BUEHLER MICROPOLISH II alumina powder, average particle diameter: 0.05 µm and 1.0 µm) is introduced into a sample bottle of glass (Asone, goodboy 100 ml), and stirred 2 minutes or longer. Then, a tack preventing layer is formed on a surface of a self-fusing seal material by putting, in the above-mentioned sample bottle, a self-fusing seal material (Product of Fuji Polymer Industries Co., Ltd, Fujipoly, flat tape 5TVO. 25-25, thickness: 0.25 µm, width: 25 nm) cut in a form having a length of 50 mm and a width of 10 mm, and set in a jig for preventing adhesion to wall surface, and stirring for a time longer than or equal to 2 minutes. Two of the self-fusing seal material taken out from the sample bottle are lightly superposed so that the tack preventing layers are contacted with each other, and a pressuring operation is performed for pressurization at 5 kPa and 100 kPa, 25° C., for 10 minutes. Thereafter, the T-shaped peel test is performed at a peeling speed of 6 cm/min with a compression tester (produced by Kato Tech Co., Ltd.), and the self-fusing adhesive force (T peel strength) is measured. The results are shown in Table 1.

TABLE 1

| Additive | Coating quantity (g/m2) | T Peel Strength (N/mm) | |
|---|---|---|---|
| | | 5 kPa | 100 kPa |
| alumina powder average particle diameter: 1.0 µm | 6 | 0.00 | 0.20 |
| alumina powder average particle diameter: 0.05 µm | 2 | 0.01 | 0.17 |
| none | 0 | 0.32 | 0.39 |

From Table 1, it is understood that the self fusing adhesive forces (T peal strengths) before pressurization and after pressurization, of the self-fusing seal material can be readily adjusted to desired values by application of adequate tack preventing additive, even if the self-fusing seal material produces a strong fusing force merely by contact at a null pressure (lower than 1 kPa) at a room temperature as in this practical example. In this practical example, the self-fusing force (T peel strength) before pressurization (5 kPa) and the self-fusing force (T peel strength) after pressurization (100 kPa) are measured by the T peel test at the peeling speed of 6 cm/min. When the T peel test is performed at a peeling speed of 50 cm/min, the self-fusing force (T peel strength) before pressurization (5 kPa) and the self-fusing force (T peel strength) after pressurization (100 kPa) are both higher than the self-fusing forces (T peel strengths) measured at the peeling speed of 6 cm/min.

The invention claimed is:

1. A fuel cell comprising:
a lamination of a membrane electrode assembly including an anode electrode layer and a cathode electrode layer on opposite sides of an electrolyte membrane and a separator;
a first layer of a self-fusing seal material provided at an end portion of the electrolyte membrane and a second layer of the self-fusing seal material provided at an opposing end portion of the separator, the self-fusing seal material configured to develop adhesion in a contact interface between the first layer and second layer of self-fusing seal material under lamination pressure; and
a tack preventing layer on a surface of the self-fusing seal material of the first layer and the second layer configured to reduce adhesion in the contact interface at low pressure.

2. The fuel cell of claim 1, wherein the self-fusing material includes polyorganosiloxane and a boron compound.

3. The fuel cell of claim 2, wherein the self-fusing material further includes a tin compound.

4. The fuel cell of claim 1, wherein the first layer of the self-fusing seal material is provided to a first side and a second side of the end portion of the electrolyte membrane.

5. The fuel cell of claim 4, wherein the self-fusing seal material on the first side of the electrolyte membrane is spaced apart from the anode electrode layer and is equal in thickness to the anode electrode layer, and the self-fusing seal material on the second side of the electrolyte membrane is spaced apart from the cathode electrode layer and is equal in thickness to the cathode electrode layer.

6. The fuel cell of claim 4, wherein the self-fusing seal material on the first side of the electrolyte membrane is spaced apart from the anode electrode layer and adjacent gas diffusion layer and is equal in thickness to the anode electrode layer and an adjacent gas diffusion layer, and the self-fusing seal material on the second side of the electrolyte membrane is spaced apart from the cathode electrode layer and an adjacent gas diffusion layer and is equal in thickness to the cathode electrode layer and the adjacent gas diffusion layer.

7. The fuel cell of claim 1 further comprising:
a reinforcing layer interposed between the first layer of the self-fusing seal material and the electrolyte membrane.

8. The fuel cell of claim 1, wherein the end portion of the separator is thinner than a remaining portion of the separator to accommodate the second layer of the self-fusing seal material while providing clearance between unit cells.

9. The fuel cell of claim 1, wherein the tack preventing layer is a fine powder.

10. The fuel cell of claim 9, wherein the fine powder comprises one or both of alumina powder and silica powder.

11. The fuel cell of claim 9, wherein the fine powder has an average grain diameter between 0.001 μm-10 μm.

12. A fuel cell production method comprising:
(1) coating a first layer of a self-fusing seal material on an end portion of an electrolyte membrane and a second layer on an opposing end portion of a separator, the self-fusing seal material configured to develop adhesion in a contact interface between the first layer and the second layer of the self-fusing seal material under lamination pressure;
(2) hardening the self-fusing seal material;
(3) forming a tack preventing layer on a surface of the self-fusing seal material of the first layer and the second layer, the tack preventing layer configured to reduce adhesion between the contact interface at low pressure;
(4) layering a membrane electrode assembly formed by sandwiching the electrolyte membrane between the anode electrode layer and the cathode electrode layer with the separator;
(5) aligning the membrane electrode assembly and the separator; and
(6) adhering the lamination by pressurizing the lamination to adhere the contact interface between the first layer and the second layer of the self-fusing material.

13. The fuel cell production method of claim 12, wherein aligning comprises vibrating the layered separator and membrane electrode assembly.

* * * * *